(12) United States Patent
Philipp et al.

(10) Patent No.: US 10,584,001 B2
(45) Date of Patent: Mar. 10, 2020

(54) METHOD FOR TRANSPORTING A MATERIAL, MULTI-DIMENSIONAL DRIVE, AND PROCESSING DEVICE

(71) Applicant: Robert Bosch GmbH, Stuttgart (DE)

(72) Inventors: Andre Philipp, Gangelt (DE); Markus Hanisch, Markgroeningen (DE); Huu-Thanh Phan, Karlsruhe (DE); Wilco Pancras, Geldrop (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/091,169

(22) PCT Filed: Mar. 8, 2017

(86) PCT No.: PCT/EP2017/055461
§ 371 (c)(1),
(2) Date: Oct. 4, 2018

(87) PCT Pub. No.: WO2017/174286
PCT Pub. Date: Oct. 12, 2017

(65) Prior Publication Data
US 2019/0152724 A1 May 23, 2019

(30) Foreign Application Priority Data
Apr. 4, 2016 (DE) .................. 10 2016 205 513

(51) Int. Cl.
*B65G 54/02* (2006.01)
*G01G 19/22* (2006.01)
(Continued)

(52) U.S. Cl.
CPC .............. *B65G 54/02* (2013.01); *B65G 43/00* (2013.01); *G01G 19/00* (2013.01); *G01G 19/22* (2013.01); *B65G 2203/0266* (2013.01)

(58) Field of Classification Search
CPC ........ G01G 11/00; G01G 11/12; G01G 13/00; G01G 19/00; G01G 19/22; G01G 13/02;
(Continued)

(56) References Cited

U.S. PATENT DOCUMENTS 5,689,092 A * 11/1997 Wurz .................. G01G 11/006
177/119
7,036,653 B2 * 5/2006 Reznik ................ B65G 1/0478
198/401

(Continued)

FOREIGN PATENT DOCUMENTS

DE 19945584 3/2001
JP S55119616 A 9/1980
(Continued)

OTHER PUBLICATIONS

International Search Report for Application No. PCT/EP2017/055461 dated May 18, 2017 (English Translation, 2 pages).

*Primary Examiner* — James R Bidwell
(74) *Attorney, Agent, or Firm* — Michael Best & Friedrich LLP

(57) ABSTRACT

The invention relates to a method for transporting a product (50), wherein a carrier (10) is used for receiving and carrying the product (50), at least one variable is detected that is representative for a moving state of the carrier (10) and thus, the moving state of the carrier (10) with or without product (50), prior to, during, and/or after a transport process of the carrier (10), (a) from a variable representative of a change in the moving state of the carrier (10), and/or (b) from a variable representative for a means for reaching and/or maintaining a moving state of the carrier (10) with or without product (50), the mass of the product (50) is determined.

17 Claims, 12 Drawing Sheets

(51) Int. Cl.
*B65G 43/00* (2006.01)
*G01G 19/00* (2006.01)

(58) Field of Classification Search
CPC ........ G01G 13/026; G01N 3/56; B65G 43/08; B65G 43/00; B65G 2203/0266; B65G 54/02
USPC ................. 177/145, 25.11, 119, 121, 26, 52; 198/502.2
See application file for complete search history.

(56) References Cited

U.S. PATENT DOCUMENTS

| | | | |
|---|---|---|---|
| 9,004,271 B2* | 4/2015 | Fourney | G01G 11/003 198/502.2 |
| 9,476,757 B2* | 10/2016 | Kleczewski | G01G 19/035 |
| 2007/0006942 A1* | 1/2007 | Pluvinage | B01L 3/021 141/83 |

FOREIGN PATENT DOCUMENTS

| | | |
|---|---|---|
| JP | S6472009 A | 3/1989 |
| JP | H0336115 A | 2/1991 |
| JP | H09308019 A | 11/1997 |
| JP | 2005127858 A | 5/2005 |
| WO | 2004074057 | 9/2004 |
| WO | 2015056847 | 4/2015 |
| WO | 2016034411 A1 | 3/2016 |

* cited by examiner

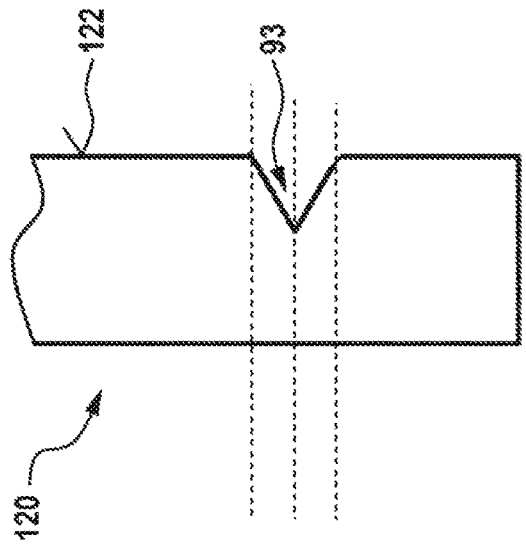
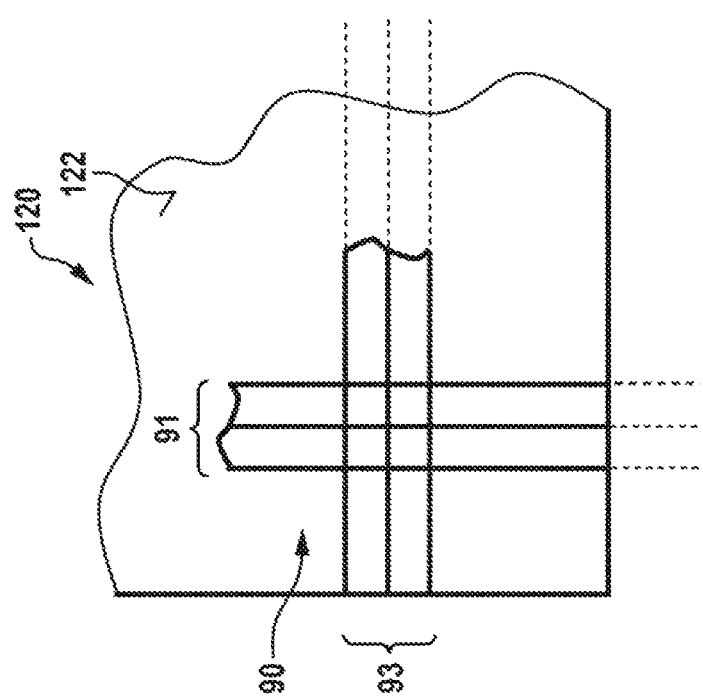
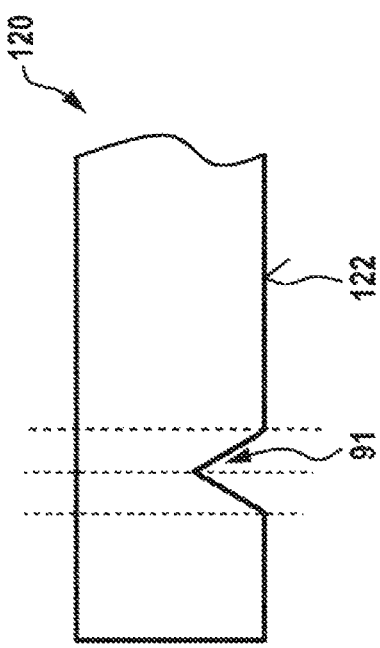
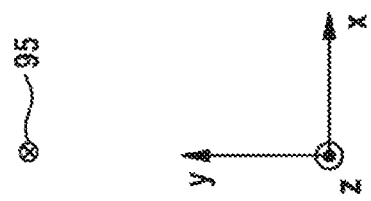

METHOD FOR TRANSPORTING A MATERIAL, MULTI-DIMENSIONAL DRIVE, AND PROCESSING DEVICE

BACKGROUND OF THE INVENTION

The present invention relates to a method for transporting a product, to a multidimensional drive, in particular a drive having six degrees of freedom and/or a planar drive, and to a processing device for processing a product and in particular a tubular bag system.

Different mechanisms for moving and positioning carriers for the respective product to be handled are used during the handling of products, for example during the filling and/or transportation thereof. It is frequently necessary to evaluate the product to be handled with respect to its mass or its weight. Weighing devices are used for this purpose, which are designed and arranged separately from a fundamental transportation device, however. Functions of transportation and handling and functions of weighing are therefore conventionally provided implemented separately. This frequently requires additional expenditure on apparatus and/or logistics.

SUMMARY OF THE INVENTION

The method according to the invention has the advantage in relation thereto that procedures of transportation or handling, on the one hand, and weighing and thus determination of the mass of the product, on the other hand, are implemented in a unified manner and without additional expenditure on apparatus and/or logistics. This is achieved according to the invention in that a carrier is used to receive and carry the product, in that at least one variable representative of a movement state of the carrier and thus the movement state of the carrier with and without product is acquired before, during, and/or after a transportation procedure of the carrier, the mass of the product is determined (a) from a variable representative of a change of the movement state of the carrier and/or (b) from a variable representative of a means for achieving and/or maintaining a movement state of the carrier with and without product. The method according to the invention is therefore made particularly simple, because one or more variables, on the basis of which the mass of the product can then be determined, are inherently derived from the procedure of the transportation as a handling process per se. The variable on which the mass determination of the product is based is in each case a variable which is representative (a) of a change of a movement state of a carrier used or else (b) of a means for achieving and/or maintaining a movement state of the carrier, specifically in each case with and without product.

According to the invention, in each case the movement state of the carrier for the product to be transported and/or handled is used.

This is because the movement state of the carrier changes—if no countermeasures are taken—if the mass of the carrier as a whole changes, specifically by supplying or metering the product.

According to the invention, either the change of the movement state itself is acquired or alternately those measures which have to be taken to maintain a previous movement state of the carrier are evaluated.

In one advantageous refinement of the method according to the invention, specific embodiments of the movement state of the fundamental carrier are taken into consideration. They can also be used in combination with one another.

On the one hand, a movement state of the carrier can be a state of rest of the carrier, specifically in particular with respect to at least one reference surface. In this case, in particular a state having constant distance between carrier and the reference surface can be used as the basis. Making reference to multiple reference surfaces is also conceivable. A state of rest with respect to a reference surface can also mean that a constant distance exists with respect to the reference surface, and a deviating or arbitrary movement therefrom takes place with respect to one or more surfaces extending perpendicularly to the reference surface.

Alternatively or additionally, in a movement state of the carrier, reference can be made to a state having constant velocity of the carrier parallel and/or perpendicular to a given reference surface. The movement can also exist with respect to further surfaces perpendicular to the reference surface having a deviating or arbitrary movement state of the carrier in this context.

Furthermore, alternatively or additionally, making reference to a vibration state as a movement state of the fundamental carrier is also conceivable. In the case of such a vibration state, at least the product vibrates on the carrier—in particular linearly—in a plane parallel or perpendicular to a reference surface around a defined rest position. The vibration movement can also be overlaid with a further movement state. This further movement state can also relate to the reference surface or to surfaces perpendicular to the reference surface.

In another refinement of the method according to the invention for transporting a product, defined specific variables which can be ascertained from a detection or measuring process are used for the determination of the weight or the mass of the product. It can thus be provided that (a) the variable representative of a movement state of the carrier or of its change and/or (b) the variable representative of a means for achieving and/or maintaining a movement state of the carrier with and without product is a distance, a distance change, a velocity, a velocity change, an acceleration, a force, a variable which causes a force, in particular a magnetic flux density, an electrical current strength, or its change with respect to time.

The maintenance of a movement state of the carrier can be based in particular on a control loop, a feedback system, or the like.

It is thus provided in an alternative embodiment of the method according to the invention that the variable representative of a movement state of the carrier or of its change is a control variable or a variable representative of a control variable of a control loop which is used as the basis to achieve and/or maintain a movement state of the carrier with and without product.

Furthermore, in a further embodiment of the method according to the invention, the variable representative of a means for achieving and/or maintaining a movement state of the carrier or of its change is a positioning variable or a variable representative of a control variable of a control loop used as the basis to achieve and/or maintain a movement state of the carrier with and without product.

Furthermore, the present invention relates to a multidimensional drive and in particular a drive having six degrees of freedom and/or a planar drive.

These are designed and configured to execute a method according to the invention for transporting a product and have appropriate means for this purpose.

In one embodiment of the multidimensional drive according to the invention, said drive is formed having a stator having a first magnet device for generating a first magnetic field and a mover, which has a second magnet device for generating a second magnetic field for magnetic interaction with the first magnetic field that can be generated by the stator and which has or forms a carrier and/or a container for a product to be transported, wherein the mover is movable in a contactless and controllable manner in relation to the stator by the magnetic interaction.

The use of mechanisms based on PM-excitable machines, reluctance motors, and asynchronously operating drives is also conceivable.

In one refinement of the multidimensional drive according to the invention, appropriate measures for acquiring variables are provided, which are useful for determining the weight or the mass of the product.

The multidimensional drive according to the preferred embodiment is thus designed having an acquisition unit, which is designed and configured to acquire (a) a variable representative of a change of the movement state of the carrier and/or (b) a variable representative of a means for achieving and/or maintaining a movement state of the carrier with and without product, and in particular has at least one sensor unit for this purpose.

For the concrete evaluation of correspondingly derived variables with respect to the characterization of the mass of the product, the multidimensional drive is advantageously designed having an analysis and control unit, which is designed and configured to record (a) a variable representative of a change of a movement state of the carrier and/or (b) a variable representative of a means for achieving and/or maintaining a movement state of the carrier with and without product and for this purpose is in particular connected via a control and measurement line to a sensor unit and/or is designed to control the stator and/or the mover.

According to a further aspect of the present invention, a processing device for processing a product and in particular a tubular bag facility are provided. It has a multidimensional drive according to the invention and is designed and configured for the purpose of transporting a fundamental product by means of a mover as a carrier of the product, in particular as or with a container.

BRIEF DESCRIPTION OF THE DRAWINGS

Embodiments of the invention will be described in detail with reference to the appended figures.

FIGS. 10 to 13 show schematic top or side views of bearing assemblies which can be used in a stator of one embodiment of the multidimensional drive according to the invention.

DETAILED DESCRIPTION

Exemplary embodiments of the invention will be described in detail hereafter with reference to FIGS. 1 to 15. Identical and equivalent and identically or equivalently acting elements and components are identified with the same reference signs. The detailed description of the identified elements and components is not reproduced in every case of the occurrence thereof.

The illustrated features and further properties can be isolated from one another in arbitrary form and combined with one another arbitrarily, without leaving the core of the invention.

Figure 1:
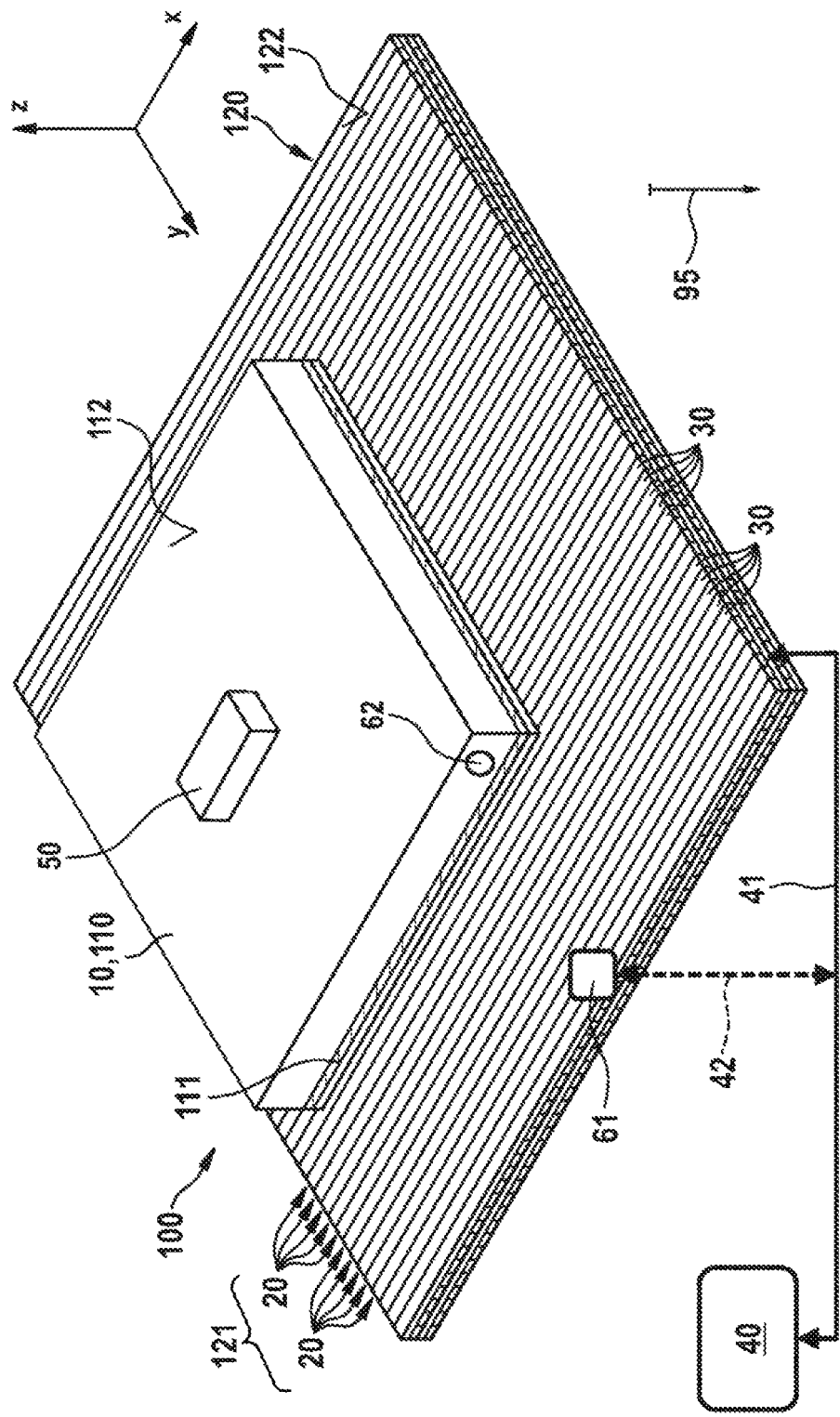
FIG. 1 is a schematic and lateral perspective view of one embodiment of a multidimensional drive according to the invention, which can be used in one embodiment of the method according to the invention for transporting a product.

FIG. 1 shows a schematic and perspective side view of a first embodiment of a multidimensional drive 100 according to the invention as a multidimensional drive in the xy plane.

This embodiment of the multidimensional drive 100 according to the invention consists of a resting stator 120, which forms the drive surface or drive plane, and a mover 110 movable in a controllable manner contactlessly on the stator 120.

In conjunction with the present invention, the mover 110 forms a carrier 10 for a product 50 to be transported and handled. The mover 110 is often also referred to as a carrier. These terms are used synonymously hereafter.

In the region of the lower side, the mover 110 has a first magnetic field unit 111 for generating a first magnetic field. In this case, it can be, for example, an assembly comprising or made of one or more permanent magnets. However, elements for dynamically generating a magnetic field and/or assemblies which generate eddy currents by interaction with the stator 120 and thus in particular enable energy conversion are also conceivable.

The stator 120 has a second magnetic field unit 121 in the region of its upper side 122, which is also referred to as a reference surface. This unit consists of a plurality of coil assemblies 20, which are also referred to as coils in short and which are in particular arranged linearly adjacent to one another, on the one hand, in the x direction and, on the other hand, in the y direction, and consist of one or more turns or windings 30 of an electrically conductive material.

The coil assemblies 20 in the x direction and in the y direction are combined with one another and can be actuated and excited independently of one another such that by way of control by means of an analysis and control unit 40 and via a control and measurement line 41, a controllable magnetic field can be generated, for example, as an alternating field, which, in interaction with the magnetic field of the mover 110 generated by the first magnetic field unit 111, enables a controlled movement of the mover 110 in the xy plane with controllable distance to the reference surface 122 of the upper side of the stator 120.

To determine position and orientation and possibly further measured variables—such as electrical current, magnetic flux density, etc., for example—an acquisition unit 60, for example having a first sensor unit or a first sensor 61 and a second sensor unit and a second sensor 62, is formed on the stator 120 and/or on the mover 110.

The sensor units 61, 62 are connected via a control and measurement line 42 to the analysis and control unit 40. This unit is in turn designed to receive and analyze variables acquired by the acquisition unit 60 and the first and second sensor units 61 and 62, respectively, in the form of measured values, in order to adapt a control of the distance of the lower side of the mover 110 from the reference surface 122 and/or the movement of the mover 110 above the reference surface 122. In addition, the analysis and control unit 40 is designed to ascertain the weight or the mass of a product 50 applied to the upper side 112 of the mover 110 as the carrier 10 on the basis of the acquired variables.

In the embodiment according to FIG. 1, the multidimensional drive 100 according to the invention is in a gravitational field, for example that of the Earth, the direction of which is indicated by the arrow 95 and which is aligned antiparallel to the z direction here. However, this is not required. Rather, the multidimensional drive 100 according to the invention can be oriented arbitrarily in relation to the direction 95 of a gravitational field and in particular with its reference surface 122 thereto. A use without gravitational field is possibly also conceivable.

Figure 2:
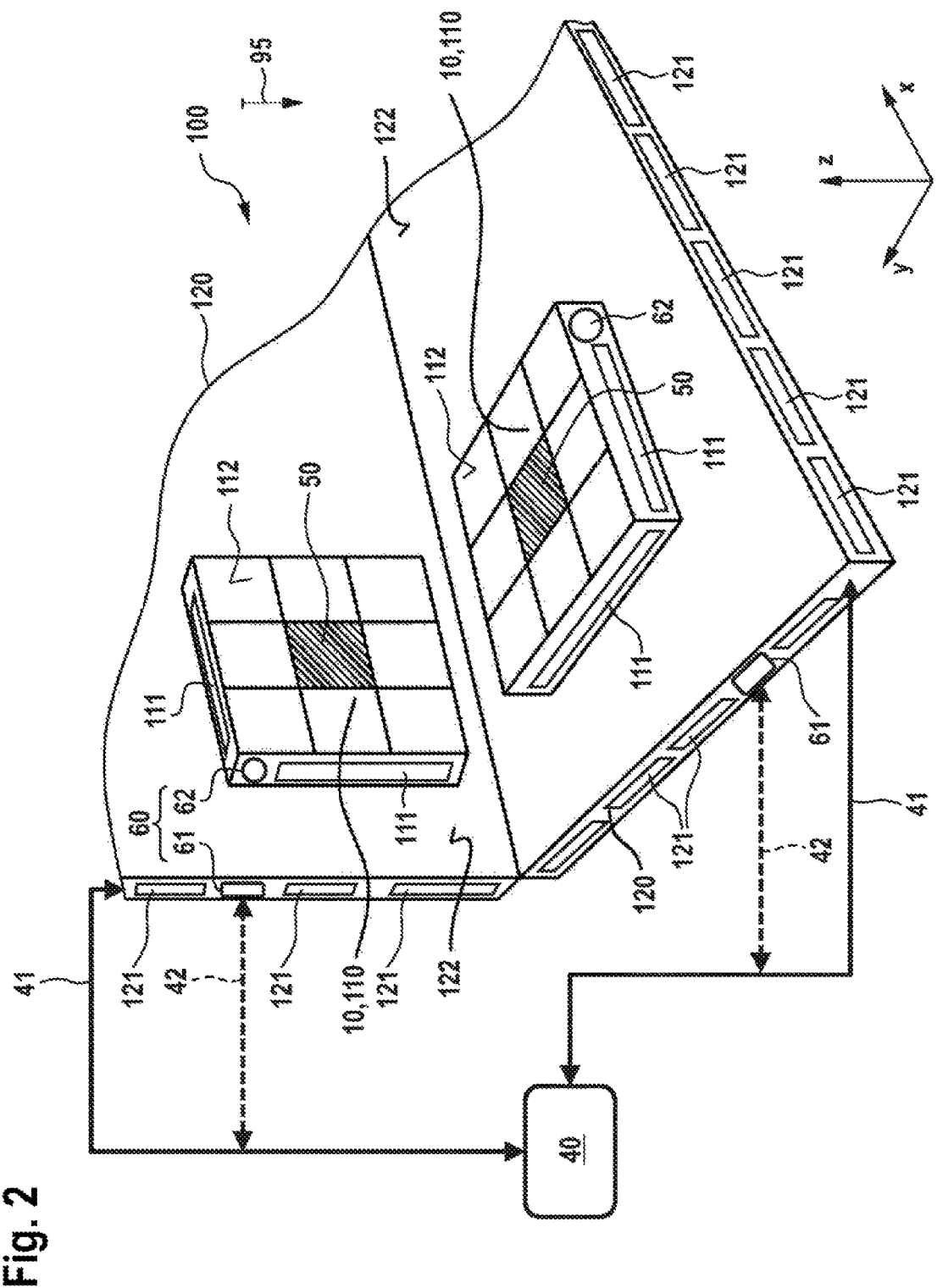
FIG. 2 shows a schematic and perspective side view of another embodiment of a multidimensional drive according to the invention for use in one embodiment of the method according to the invention for transporting a product.

In the embodiment according to FIG. 2, the multidimensional drive 100 according to the invention consists of two stators 120, which lie with the reference surfaces 122 thereof as surfaces parallel to the xy plane or parallel to the xz plane here, respectively. The reference surfaces 122 of the stators 120 are therefore perpendicular to one another. This arrangement of the stators 120 with the reference surfaces 122 thereof is also not required. This also applies with respect to the direction 95 of the indicated gravitational field.

In the embodiment of the multidimensional drive 100 according to the invention as shown in FIG. 2, two drive or movement planes are thus formed, in which movers 110 as carriers 10 for products 50 to be handled are movable controlled by means of first magnetic field units 111 and second magnetic field units 121. For this purpose, an acquisition unit 60 having first and second sensor units 61 and 62 is again connected via corresponding control and measurement lines 42 to an analysis and control unit 40, which in turn actuates the magnetic field unit 121 of the stators 120.

Figure 3:
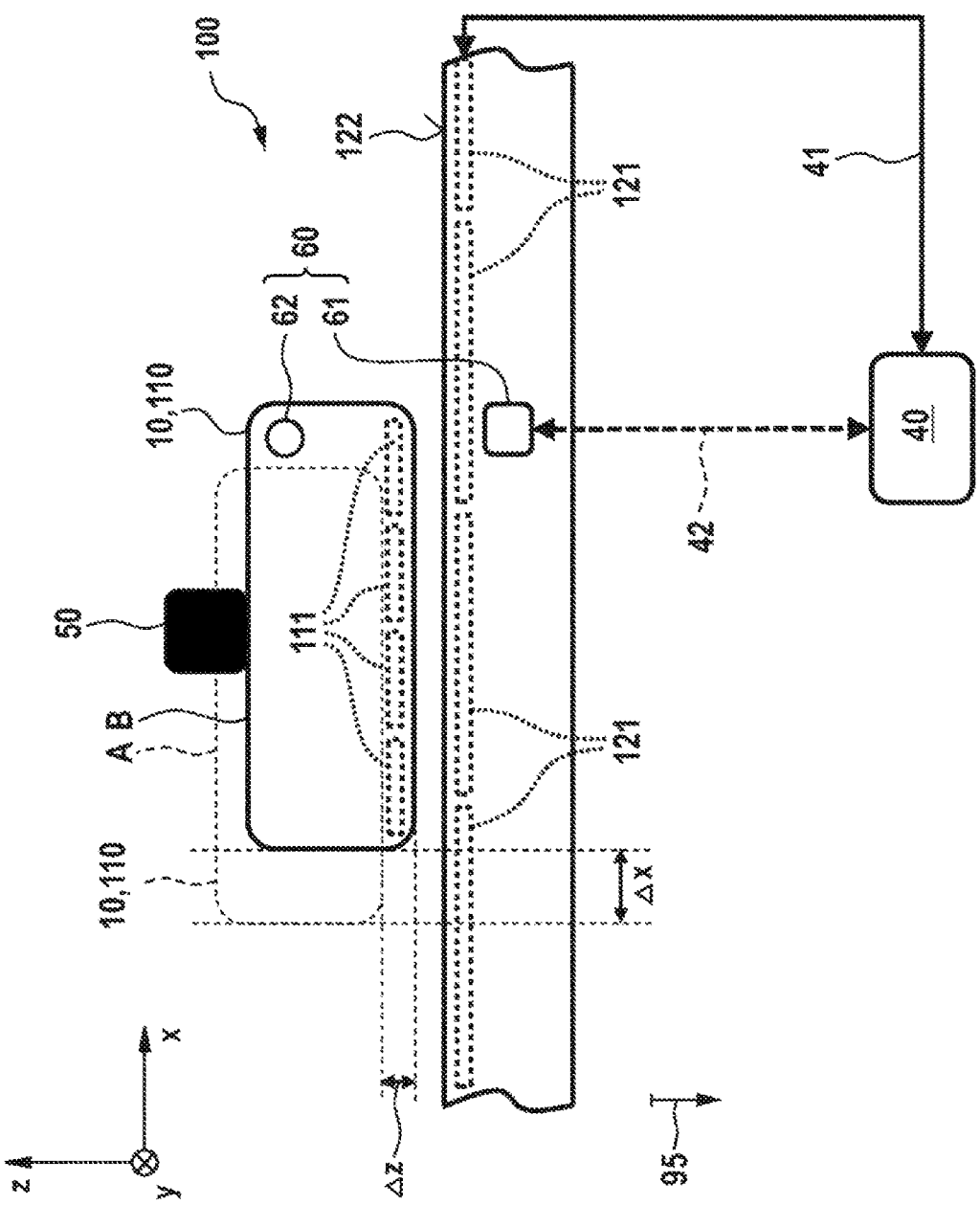
FIG. 3 shows a schematic side view in section of details of another embodiment of the multidimensional drive according to the invention.
Figure 4:
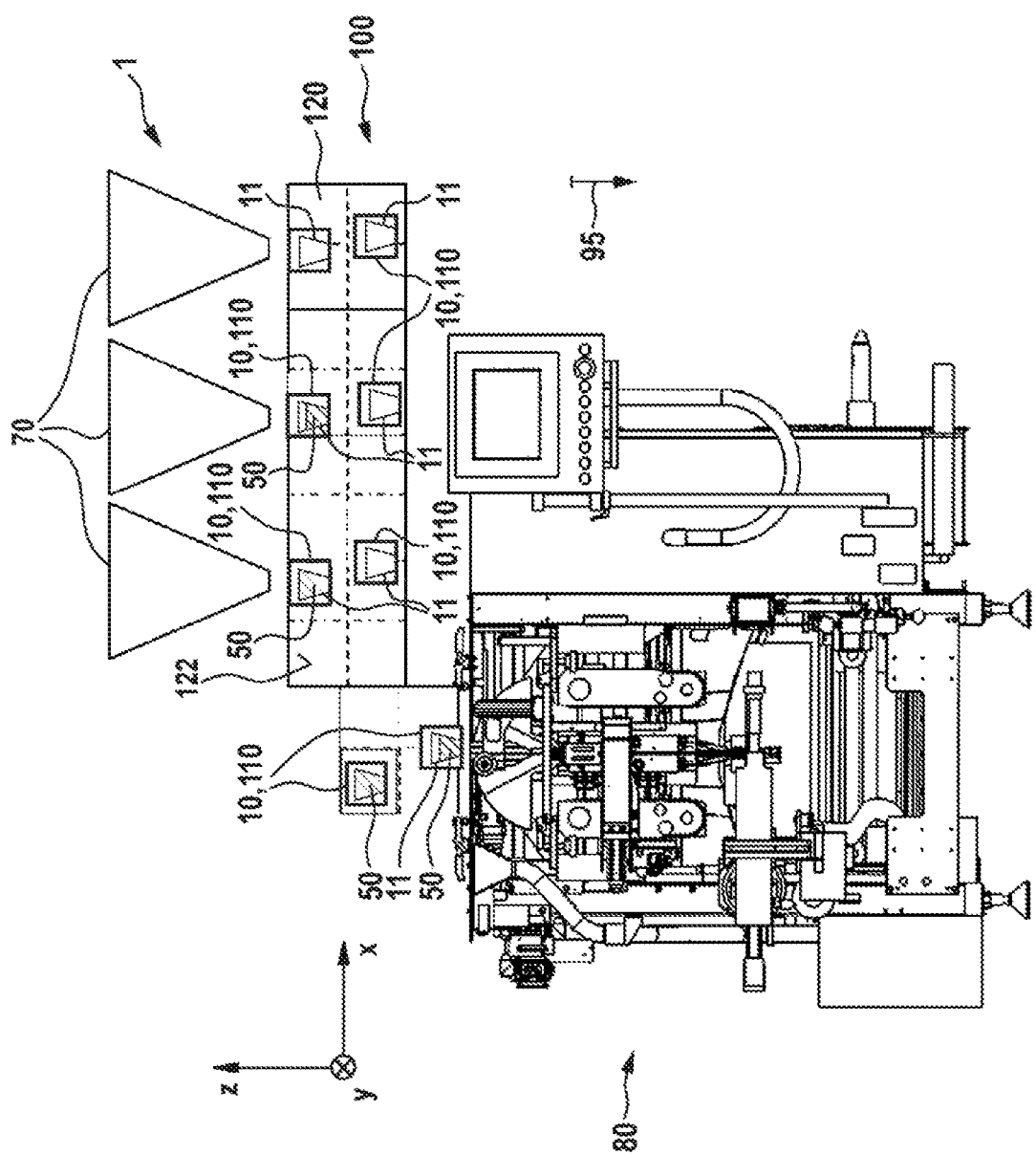
FIGS. 4 to 7 show side views of various embodiments of the multidimensional drive according to the invention in conjunction with a processing device according to the invention.
Figure 5:
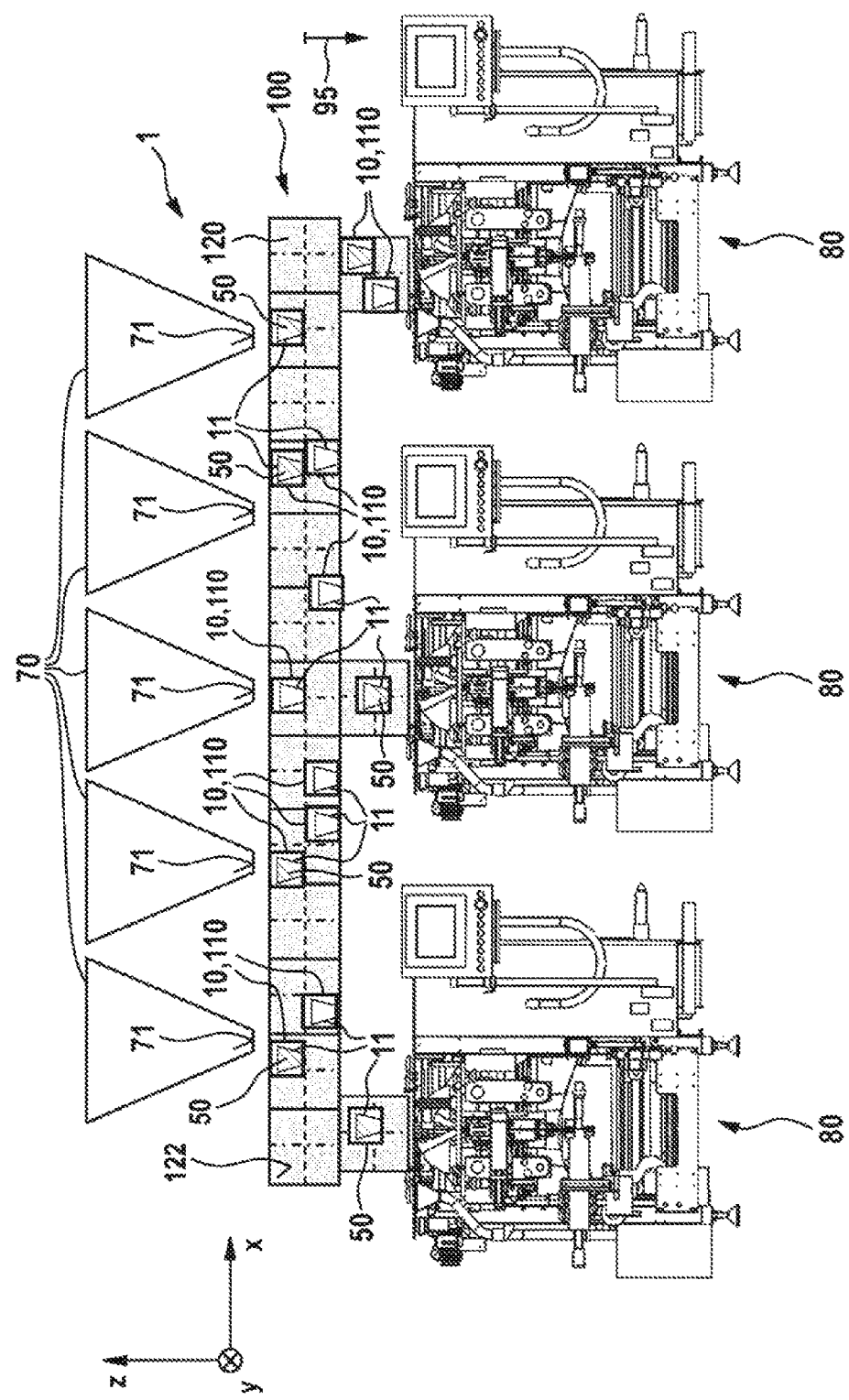
Figure 6:
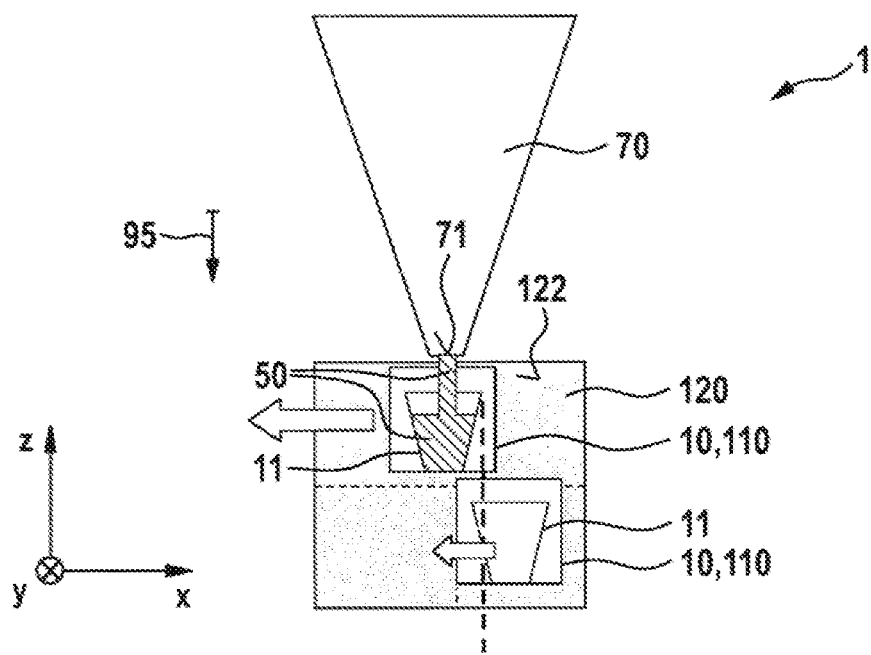
Figure 7:
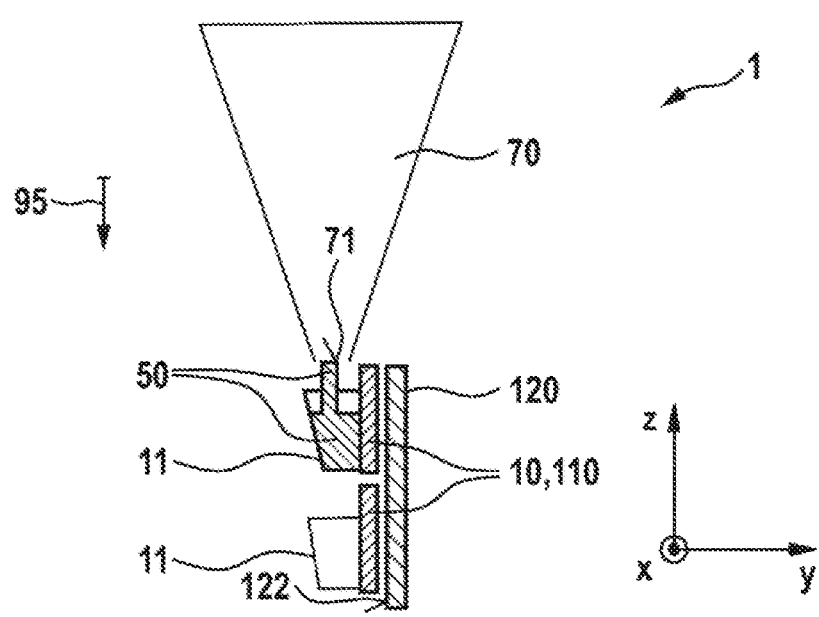

FIG. 3 shows a schematic and sectional side view of one embodiment of the multidimensional drive 100 according to the invention, which is similar to the arrangement according to FIG. 1.

The arrangement of the mover 110 as a carrier 10 for the product 50 to be transported is illustrated here in a first position or setting A without the product 50 and in a second position or setting B after the application of the product 50, for the case in which a readjustment with respect to the movement state of the carrier 10 in regard to the distance of the bottom side of the carrier 10 from the reference surface 122 does not take place or is incomplete. It can be seen that with the movement in the x direction by the absolute value Δx, an approach or lowering of the mover 110 as the carrier 10 for the product 50 takes place opposite to the z direction by the absolute value Δz.

In general, a position and/or orientation change is described by a vector $$\vec{A}=(\Delta x, \Delta y, \Delta z; \Delta rotx, \Delta roty, \Delta roty)^T.$$

According to the invention, by means of the multidimensional drive 100 and the first and second sensor units 61 and 62 provided therein, via the analysis and control unit 40, the value Δz is acquired as a measure of the change of the movement state of the mover 110, in particular with specification of the direction 95 and strength of an external gravitational field.

In this case, according to one aspect of the invention, the mass of the product 50 can be ascertained from the value Δz in case of an absent compensation control.

According to another aspect of the invention, however, in the scope of a control concept having feedback, after the application of the product 50 to the upper side 112 of the mover 110 as the carrier 10 for the product 50, the height of the carrier 10 above the reference surface 122 can also be maintained by readjustment and the value Δz=0 can thus be forced. In this context, a measure of the means which are necessary to maintain the movement state of the mover 110 as the carrier 10 above the reference surface 122 in the z direction and to prevent an approach to the reference surface 122 are then acquired via the acquisition unit 60 and the sensor units 61, 62. The means for readjustment can be, for example, the elevation of the electric current which is necessary to elevate the magnetic field via the second magnetic field unit 121 of the stator 120 and thus to generate the force which is necessary to maintain the height of the carrier 10 above the reference surface 122. The current to be applied to elevate the magnetic field and thus the force to be increased then correspond to the weight of the product 50 in the gravitational field having the direction 95. The mass of the product 50 can be concluded directly.

FIGS. 4 to 7 show the use of a multidimensional drive 100 according to the invention in conjunction with an embodiment of the processing device 1 according to the invention as a so-called tubular bag facility.

Stators 120, which are aligned with the surfaces thereof as reference surfaces 122 parallel to the direction 95 of the gravitational field used as the basis, are shown in each case. All stators 120 lie with the surfaces thereof as reference surfaces 122 and therefore with the drive surfaces parallel to the xz plane.

All embodiments of the processing device 1 according to the invention as a tubular bag facility have in FIGS. 4 to 7 filling stations 70 having outlet openings 71 provided in the lower region, which are suitable for the exit of the product 50 to be transported or handled as bulk product or as free-flowing product.

Corresponding containers 11, which are attached to the movers 110 as carriers 10, are moved into the region of an outlet opening 71 of a filling station 70, in order to be filled, by means of the correspondingly controlled movement in interaction between stator 120 and mover 110. This can be a single filling in individual operation or in parallel operation. However, it is also conceivable that the individual filling stations 70 are capable of filling the containers 11 with different materials, for example to produce mixtures. Bulk products and/or free-flowing products can be used.

It is important in the concept according to the invention in this case that during or after filling, no explicit weighing station has to be provided and approached, since a mass change of the mover 110 as the carrier 10 and thus the mass of the product 50 can be already concluded automatically and above all also continuously from the change of the movement state of a respective mover 110 as the carrier 10 for container 11 and product 50 or from the maintenance of the respective movement state of the mover 110. If a starting mass for each carrier 10 is known as a so-called tare setting, possibly based on the mass of the respective container 11, the mass or the weight of the supplied product 50 or a part thereof can be directly concluded, and therefore in the overall context of the proposed facility 1, continuous filling with different products 50 and thus exact formation of mixtures is conceivable.

After the filling, the completely or partially filled containers 11 are moved using the movers 110 as the carriers 10 to various bag stations 80 for further processing and in particular for packaging.

Figure 8:
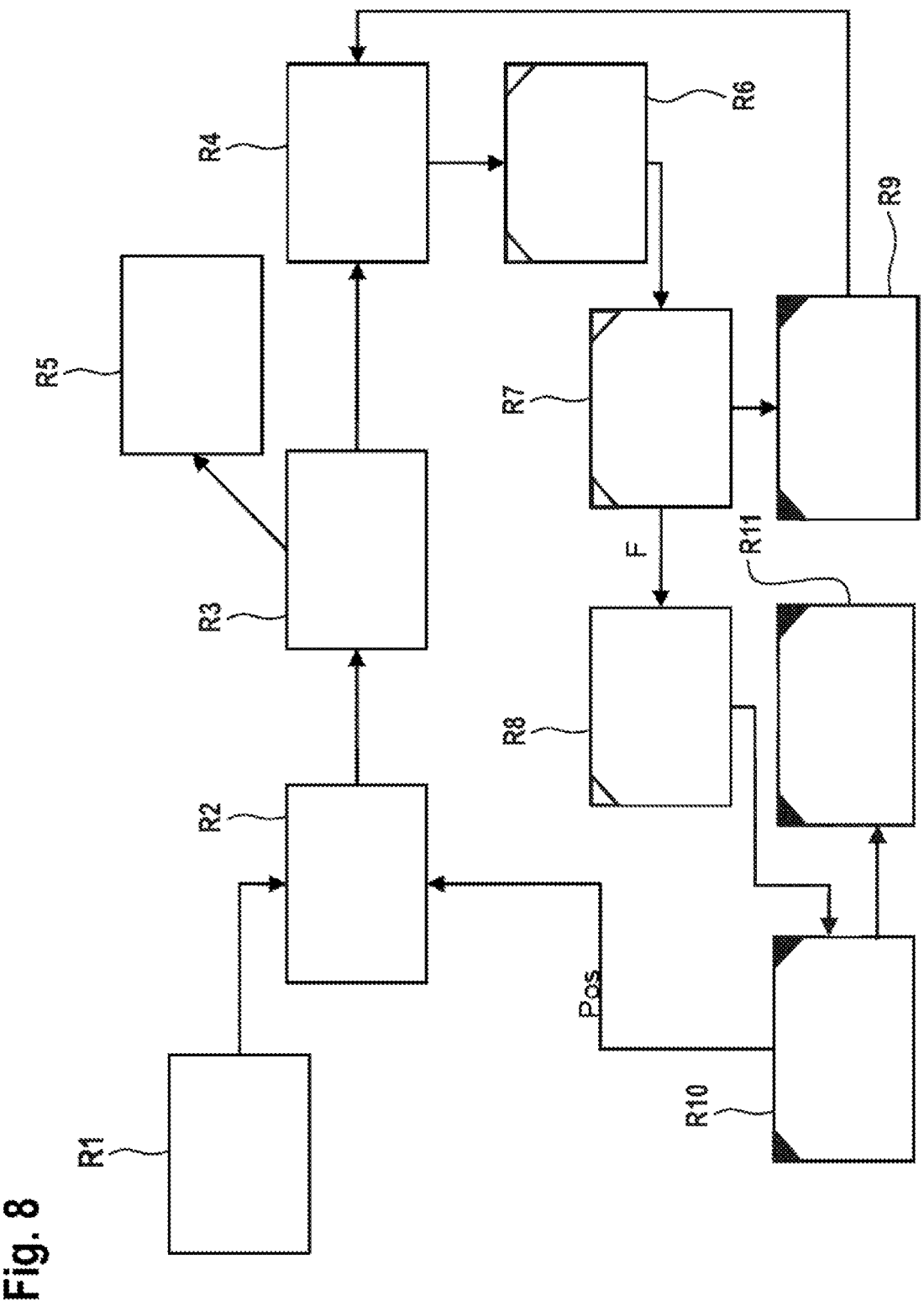
FIGS. 8 and 9 show block diagrams of embodiments of the method according to the invention for transporting a product in consideration of aspects of the mass or weight determination.
Figure 9:
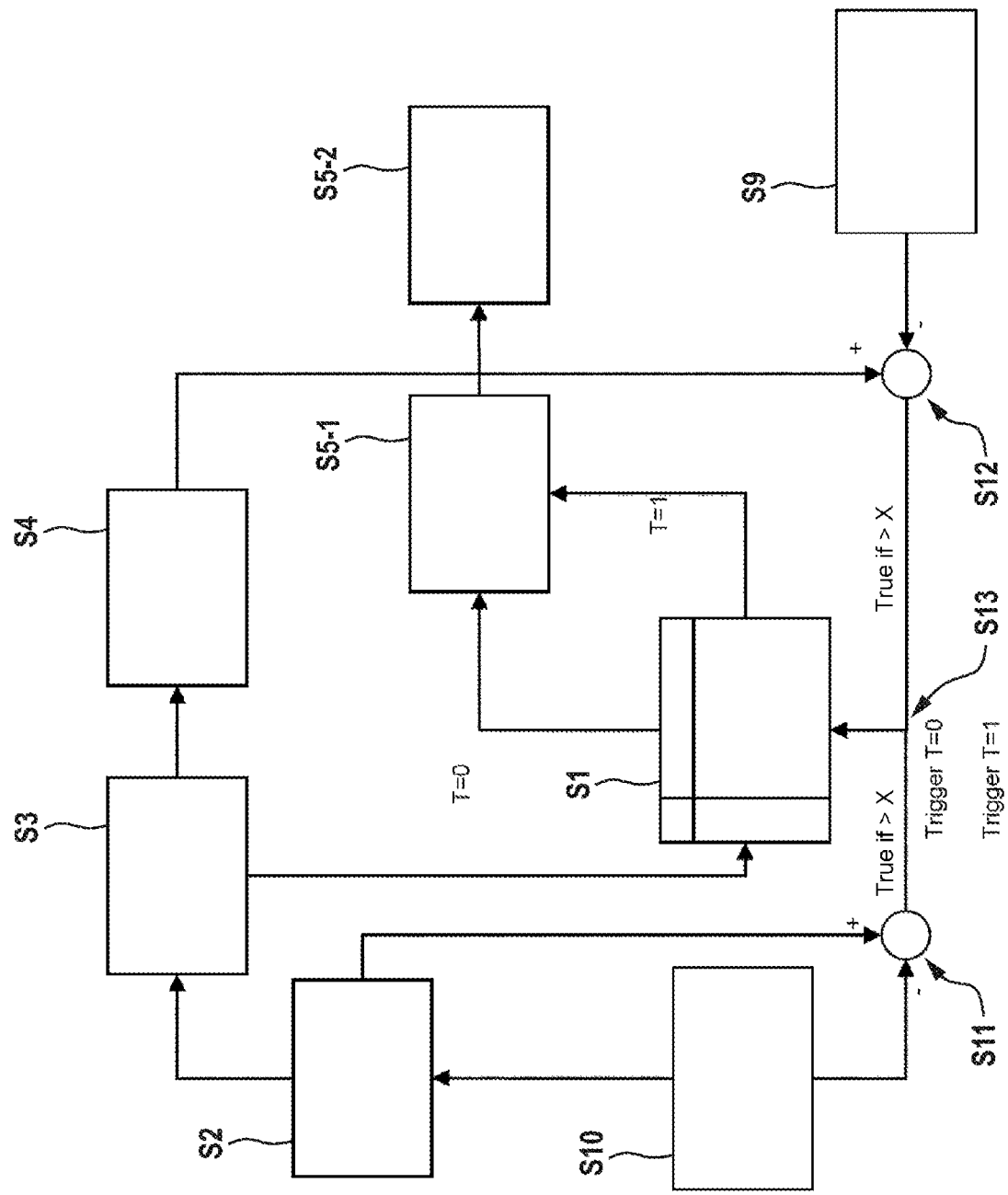
Figure 10:
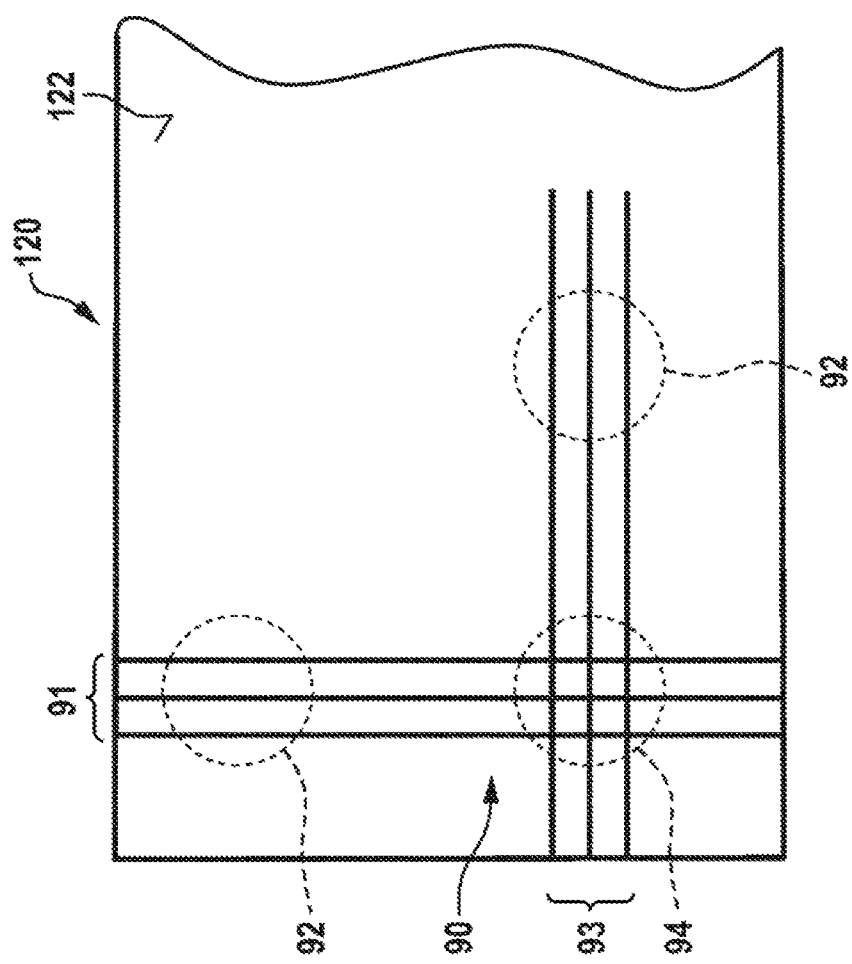

FIGS. 8 and 9 show various control concepts in the form of block diagrams, which can be used in embodiments of the method according to the invention for transporting a product.

In the embodiment according to FIG. 8, firstly, in consideration of a movement command according to step R1, a corresponding path specification takes place according to step R2 and a force specification takes place according to step R3 with respect to six degrees of freedom of the movement of the mover 110 as the carrier 10 in interaction with the stator 120. In consideration of a current specification according to step R4, in conjunction with a current measurement according to step R9 and a position measurement according to step R10 with activation via an end-stage step R6 for the application to the second magnetic field units 121 and in particular the coil assemblies 20 according to step R7, a force generation takes place according to step R8, which results when fed back in a maintenance of the movement state of the mover 110 as the carrier 10 and in particular to keeping the distance constant between carrier 10 and reference surface 122.

In step R1, an excitation can take place according to $$A(t) = A_0 \cdot \cos(\omega \cdot t)$$

and therefore the frequency behavior and, therefrom, the mass can be ascertained in step R11.

In this context, the mass of the product 50 in the container 11 on the carrier 10 can be ascertained via the exerted additional force, conveyed by the additional current to be applied, after calibration and gauging, which take place beforehand.

FIG. 9 shows an alternative embodiment of the control method in consideration of a storage procedure S1 and a force difference calculation according to step S5-1 with derivation of the weight as the absolute value of the force in the calculation step S5-2, wherein again a path specification according to step S2, a force specification in six degrees of freedom according to step S3, and a current specification according to step S4 with current measurement in step S9 and position measurement in step S10 are to be taken into consideration.

FIGS. 10 to 13 show embodiments of a multidimensional drive 100 according to the invention with special design of the stator 120 used as the basis therein and its upper side 122 as a reference surface.

In general, the operating point for the measurement should be selected such that a small change in the force or load results in a large change in the measured variable used as a basis, for example a current change.

In this embodiment, the surface 122 of the stator 120 has a bearing assembly 90 having bearings 91 and 93 in the x direction and in the y direction, respectively, which form floating bearings 92 taken per se and generate a fixed bearing 94 in the region where they cross over or intersect. The use of such a bearing assembly 90 can contribute to enhancing the measurement accuracy in the determination of the mass or the weight of the product 50 used as the basis.

Figure 15:
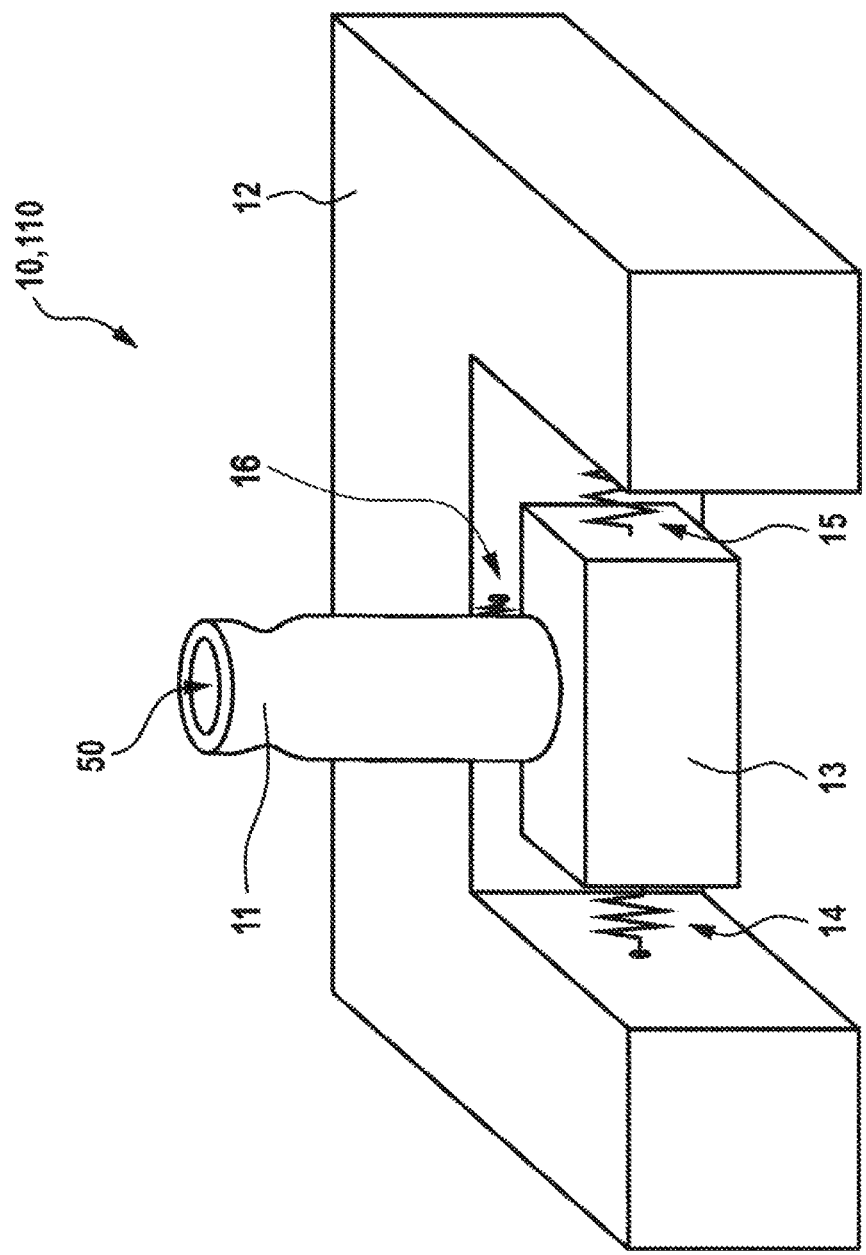
FIG. 15 shows a schematic and perspective side view of a carrier for a product, which can be used as the basis in the determination of the mass of the product from the change of a vibration characteristic.

In conjunction with a refinement of the present invention, it is also conceivable to design a mover 110 as a carrier 10 for a vessel 11 and a product 50 to be accommodated therein according to FIG. 15. In this case, the carrier 10 has a main part 12 as a frame and a vibrating body 13 as the actual carrier for the container 11. The vibrating body 13 is elastically connected to the inner frame of the main part 12 via elastic suspensions 14, 15, 16, for example via spring elements. In this manner, the vibrating body 13 can be set into vibrations in conjunction with container 11 and product 50, on the one hand, and the main part 12, on the other hand.

Figure 14:
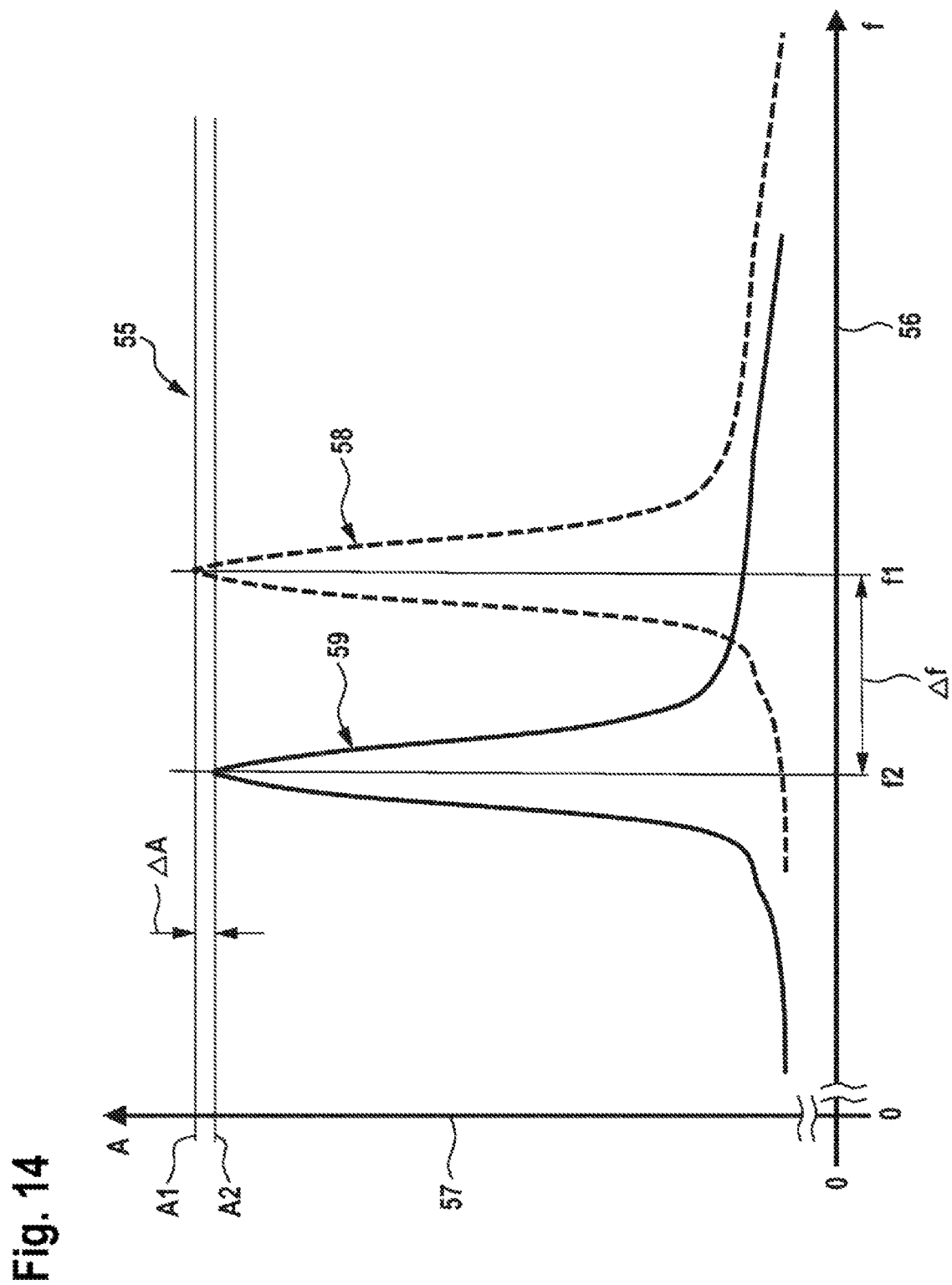
FIG. 14 explains in the form of a graph the determination of the mass of a product from the analysis of the change of a vibration characteristic of a carrier.

FIG. 14 shows, in the form of a graph 55, the amplitude spectrum of such a vibrating system made of main part 12 and vibrating body 13.

The vibration frequency f is plotted on the abscissa 56 and the amplitude A is plotted on the ordinate 57.

For the system of the mover 110 as the carrier 10 shown in FIG. 15, the curve results according to track 58 if the container 11 is not filled with a product 50. The typical resonance curve having a frequency f1 results, in which the amplitude A is at a first maximum value A1.

After the filling of the container 11 with the product 50, a spectrum results according to the track 59. The maximum amplitude is at a lower value A2, for example because of damping, and this is at a lowered frequency f2.

On the basis of the typical relationship according to the following equation (1)

$$f_G = \frac{1}{2\pi} \cdot \sqrt{\frac{c_{ax}}{m}}, \qquad (1)$$

the mass increase and thus the weight or the mass of the supplied product 50 can be concluded. In this case, m is the total mass of the mover 100 as the carrier, i.e., in consideration of its intrinsic mass and possibly the mass of the vessel 11 and product 50, possibly also in consideration of the mass of the vibrating body 13, if this can be ascertained. If, for example, the resonant frequencies in the loaded state and in the unloaded state of the mover 110 are known, the mass of the product 50 can thus be concluded via the relationship (1) and a differential calculation, if the parameter $c_{ax}$ for describing the vibration capability of the mover 110 is known.

These and further features and properties of the present invention will be explained in greater detail on the basis of the following explanations:

Systems are known and are in use which implement either the function of transportation or the function of weighing. In this case, these are either transportation systems or weighing systems per se.

The requirement typically results therefrom of having to remove the product to be weighed from the transportation system and introduce it into a weighing system and place it on a weighing unit therein for a weighing procedure.

In the case of bulk products or free-flowing products, a container is moreover necessary, which can accommodate the product and can be placed both on the transportation system and also on the weighing system. In this case, the empty weight of the container has to be known to be able to ascertain the actual weight of the product.

Moreover, known weighing systems and in particular scales are one-dimensional in the function thereof. For the operation and for the installation, this means that only the forces can be measured which extend parallel to a measurement axis. Angle errors result directly in a corruption of the result.

According to the present invention, the function of transportation is linked to the function of weighing.

Since force monitoring is always provided during the weighing procedure, a differential weighing can also take place during the metering in the case of bulk products or free-flowing products. Only the weight of the bulk product or free-flowing product is therefore acquired, but not that of auxiliary units, such as containers or other components.

Mass or weight variations of the periphery also do not play a role, since only the force change due to the metered material is acquired. An arbitrary large number of reference points can thus be acquired, for which a mass or weight change can be acquired.

This is advantageous in particular if multiple bulk products or free-flowing products are to be metered into a container and both the total weight or the total mass and also the individual weights or masses of the individual components are to be acquired.

In the case of bulk products, after the placement of the product on the transportation system, the load change can be acquired and therefore the piece weight of the product can be concluded.

The possibility therefore results, for example, of monitoring component presences and thus performing the installation detection even in the case of small parts, which are installed inside an assembly and which are no longer visible on the finished product.

Due to the provided force control in all spatial directions, a force change—for example due to a weight increase during the metering—is also recorded in all spatial directions. An alignment of the scales in relation to the force field of the Earth is not necessary, since this, as a result, only results in a multidimensional force vector, which represents the weighing in absolute value.

It is a core aspect of the present invention to provide a contactless and in particular floating transportation system, which preferably has six degrees of freedom.

Due to the free control of all six spatial directions, a force equilibrium is always generated, essentially to achieve or maintain a predefined position in space.

If the external loads or force actions are turned off and, for example, a force change is induced by metering a bulk or free-flowing product onto the carrier, the force change is thus equivalent to the metered weight or at least indicates an amount of the metered weight.

If the force or position control is designed sufficiently accurately, weighing results can be achieved here which also have high resolution for bulk or free-flowing products, in addition to small components.

Core components for accurate weighing are, on the one hand, a good system knowledge and, on the other hand, a spatial separation of disturbances, for example sufficiently strong air flows or the like. Furthermore, the accuracy of the measurement system, for example, in the position determination, and the accuracy of the current control play a decisive role. Since the current change does not run linearly in relation to the force change, measurement procedures are advantageously intentionally placed in the matching operating point for this purpose, to achieve the greatest possible current change with the least possible force change. The tendency is for this to be achieved at great altitude. However, it is to be ensured in this case that the measurement resolution does not scale in the opposite direction.

Since a measurement is not always necessary, the system can optionally be embodied in two variants.

A somewhat lower measurement accuracy results in the normal embodiment. This can be used, for example, in the case of a simple presence detection or to obtain rough estimations of the weight.

If a higher accuracy is required, the required measurement resolution and thus an increased accuracy can be implemented via an improved measuring system and adapted power electronics.

The proposed weighing technology according to the invention has the special feature that the weight can always be ascertained via all three translational axes independently of the alignment. The alignment in relation to the gravitational vector is thus dispensed with.

Since the drive principle according to the invention has only gravity as an external force component, operation is implementable both in a vertical arrangement and also in a horizontal arrangement.

The permanent magnets of the carrier ensure, in conjunction with the controlled magnetic fields of the stator, a resulting force, which can move the carrier in accordance with the absolute value and the direction. Other principles are applicable.

If the drive is operated in the position control, a change of the external force results in a small position deviation, which requires a readjustment and results in a corresponding change of the coil currents, in order to achieve a force equilibrium again.

In this case, the required counterforce can be ascertained via the coil current and output as a measured variable.

Horizontal Weighing

The carrier runs along or in a horizontal plane, for example the xy plane. Metering results in a force change perpendicular to the xy plane, i.e., in the z direction, if the force change is introduced in the center of gravity.

Off-center forces result in a torque about the x and/or y axis. Depending on the final characteristic map of the drive, a great lever in relation to the center of gravity can be advisable to enhance the resolution and thus the accuracy of the system.

Vertical Weighing

If the carrier is moved along a wall, for example parallel to the xz or yz plane, metering thus results in a force change in the y direction and a torque change in the x and possibly the z direction.

A great lever can also pay dividends here if a greater resolution and thus accuracy is required.

In particular if such a weighing device is combined with a vertical tubular bag machine, the possibility results that the weighing can take place not above the VFFS, as is presently typical, but rather adjacent to the machine. Furthermore, multiple weighing actions, for example metering different bulk or free-flowing products, are also conceivable here.

Complex pre-mixing with the risk of unmixing can thus be avoided.

Personalized product filling can thus also be implemented without additional effort. The carrier approaches the different feeds in series and receives the matching quantity metered as ordered. If all required metering actions are completed, the weighed filling product is moved over the forming tube and can be transferred rapidly with low falling height to the tubular bag machine.

For this purpose, a position X is approached and maintained by the transportation system, which corresponds to the path specification in FIGS. 8 and 9. If the position X is defined, a typical force specification results, which thus represents the tare weight, specifically according to the trigger of position measurement in FIG. 9. If a mass and weight change occurs as a result of a metering procedure, the force specification changes. This is proportional to the changes in the electrical currents which are necessary to continue to ensure the position X. This delta—possibly in three dimensions—therefore represents the measuring standard of the mass or the weight; the absolute value of this factor is thus the weight.

If weight monitoring is to be implemented, in the empty state, the carrier or mover is thus to be measured once in the position X and this force specification is to be stored.

At any later point in time, a difference measurement can thus be carried out when the force specification at a standstill is ascertained again in the position X.

It is also conceivable to carry out the measurement independently of the location and thus the tare measurement in the position X and the net measurement in the position Y. However, inaccuracies can occur in this case, since changed boundary conditions can exist at the other position. It is therefore advantageous to perform a calibration beforehand in this case, which takes into consideration local variations due to the structure.

In particular the inductance is to be mentioned here, and also the characteristic of the participating electronics, and all assemblies of the electromagnetic energy conversion.

Calibration

If comparable measurements are to be carried out using different components—i.e., stators and carriers—a comprehensive calibration concept is advantageous.

The following parameters can be taken into consideration in this case:

Magnetic field distribution on the carrier or mover: Variations have an effect directly on the required current specification. A precise knowledge is thus necessary to improve the control in this field by predicting the vibration behavior.

Measuring the coil field: different behavior also occurs here at equal setpoint value specification due to the manufacturing of both the coils themselves and also due to the tolerances of the electronic components. This is to be measured precisely and made available as a correction value for the controller.

In particular, vibration of both the carrier or mover and also the stator can substantially influence the accuracy. Monitoring the vibration itself by local sensor systems and thus direct correction of the weight determination can substantially reduce this problem.

In conventional position controllers, a high rigidity is desired between stator and rotor. This necessarily results in a transfer of the vibration of the stator to the rotor. Since this already has damping due to its intrinsic mass, the control parameters should be adapted accordingly here for the measurement operation.

Additional environmental sensors can be used to substantially increase the accuracy here. Temperature, ambient humidity, height above sea level, etc. are to be mentioned.

Measures to Increase the Accuracy

In addition to the measures from the field of calibration, further measures can be used to increase the accuracy:

The measurement can be redirected to a torque measurement by providing a support, which does not introduce interfering forces into the carrier. This has the advantage in particular at small weights that the accuracy can be increased further, as shown by way of example in FIGS. 10 to 13.

Since the frequency of the overall structure is described by the following equation (1)

$$f_G = \frac{1}{2\pi} \cdot \sqrt{\frac{c_{ax}}{m}}, \quad (1)$$

it can be of interest to also use the vibration behavior as a measuring standard by the skillful design of $c_{ax}$. The resonance frequency $f_G$ is ascertained by the analysis of the vibration frequency f of the electrical currents by the system itself. The goal in this case is for a small change of the mass m to be reflected in $f_G$, as shown in conjunction with FIGS. 14 and 15. If this criterion is analyzed in addition to the above-described force specification, the reliability of the weight estimation is significantly increased.

What is claimed is:

1. A method for transporting a product (50), the method comprising:

providing a multidirectional drive having a stator (120) having a first magnet unit (121) for generating a first magnetic field, and a mover (110) which has a second magnet unit (111) for generating a second magnetic field for magnetic interaction with the first magnetic field, wherein the drive further includes a carrier (10) for a product (50) to be transported, wherein the mover (110) is movable relative to the stator (120) in a contactless and controllable manner by the magnetic interaction, using the carrier (10) to receive and carry the product (50), acquiring at least one variable representative of a movement state of the carrier (10) and thus the movement state of the carrier (10) with and without product (50), and before, during, and/or after a transportation procedure of the carrier (10), determining the mass of the product (50)

(a) from a variable representative of a change of the movement state of the carrier (10) and/or (b) from a variable representative of a means for achieving and/or maintaining the movement state of the carrier (10) with and without product (50).

2. The method for transporting a product (50) as claimed in claim 1, wherein the movement state is (a) a state of rest of the carrier (10) in relation to at least one reference surface (122), (b) a state having constant velocity of the carrier (10) parallel to a reference surface (122), (c) a vibration state, in which at least the product (50) vibrates in a plane parallel to a reference surface (122) around a rest position, or (d) a combination thereof.

3. The method for transporting a product (50) as claimed in claim 1, wherein (a) the variable representative of a movement state of the carrier (10) or of its change, and/or (b) the variable representative of a means for achieving and/or maintaining a movement state of the carrier (10) with and without product (50), is a distance, a distance change, a velocity, a velocity change, an acceleration, a force, a variable which causes a force, an electrical current strength, or its change with respect to time.

4. The method for transporting a product (50) as claimed in claim 1, wherein the variable representative of a movement state of the carrier (10) or of its change is a control variable or a variable representative of a control variable of a control loop used as the basis to achieve and/or maintain a movement state of the carrier (10) with and without product (50).

5. The method for transporting a product (50) as claimed in claim 1, wherein the variable representative of a means for achieving and/or maintaining a movement state of the carrier (10) or of its change is a positioning variable or a variable representative of a positioning variable of a control loop used as the basis to achieve and/or maintain a movement state of the carrier (10) with and without product (50).

6. A multidimensional drive (100), which is designed and configured to execute the method for transporting a product (50) as claimed in claim 1.

7. The multidimensional drive (100) as claimed in claim 6, having an acquisition unit (60), which is designed and configured to acquire
   (a) a variable representative of a change of the movement state of the carrier (10) and/or
   (b) a variable representative of a means for achieving and/or maintaining a movement state of the carrier (10) with and without product (50).

8. The multidimensional drive (100) as claimed in claim 6, having an analysis and control unit (40), which is designed and configured to record
   (a) a variable representative of a change of the movement state of the carrier (10), and/or
   (b) a variable representative of a means for achieving and/or maintaining a movement state of the carrier (10) with and without product (50).

9. A processing device (1) for processing a product (5), having a multidimensional drive (100) as claimed in claim 6, which is designed and configured to transport a product (50) by means of a mover (110) as the carrier (10) of the product (50).

10. The method for transporting a product (50) as claimed in claim 1, wherein the movement state is
    (a) a state of rest of the carrier (10) in relation to at least one reference surface (122) and a state having constant distance between carrier (10) and reference surface (122),
    (b) a state having constant velocity of the carrier (10) parallel to a reference surface (122),
    (c) a vibration state, in which at least the product (50) vibrates linearly in a plane parallel to a reference surface (122) around a rest position, or
    (d) a combination thereof.

11. The method for transporting a product (50) as claimed in claim 1, wherein
    (a) the variable representative of a movement state of the carrier (10) or of its change, and/or
    (b) the variable representative of a means for achieving and/or maintaining a movement state of the carrier (10) with and without product (50),
    is a distance, a distance change, a velocity, a velocity change, an acceleration, a force, a magnetic flux density, an electrical current strength, or its change with respect to time.

12. A multidimensional drive (100) having six degrees of freedom and/or a planar drive, which is designed and configured to execute the method for transporting a product (50) as claimed in claim 1.

13. The multidimensional drive (100) as claimed in claim 12, having:
    the stator (120) having the first magnet unit (121) for generating the first magnetic field, and
    the mover (110) which has the second magnet unit (111) for generating the second magnetic field for magnetic interaction with the first magnetic field that can be generated by the stator (120) and which has or forms the carrier (10).

14. The multidimensional drive (100) as claimed in claim 12, having an acquisition unit (60), which is designed and configured to acquire
    (a) a variable representative of a change of the movement state of the carrier (10) and/or
    (b) a variable representative of a means for achieving and/or maintaining a movement state of the carrier (10) with and without product (50) and has at least one sensor unit (61, 62) for this purpose.

15. The multidimensional drive (100) as claimed in claim 12, having an analysis and control unit (40), which is designed and configured to record
    (a) a variable representative of a change of the movement state of the carrier (10), and/or
    (b) a variable representative of a means for achieving and/or maintaining a movement state of the carrier (10) with and without product (50),
    and is connected via a control and measurement line (42) to a sensor unit (61, 62) for this purpose and/or is designed to control the stator (120) and/or the mover (110).

16. A tubular bag facility (1) for processing a product (5), having a multidimensional drive (100) as claimed in claim 6, which is designed and configured to transport a product (50) by means of a mover (110) as the carrier (10) of the product (50) as or using a container (11).

17. A method for transporting a product (50), the method comprising:
    using a carrier (10) to receive and carry the product (50),
    acquiring at least one variable representative of a movement state of the carrier (10) and thus the movement state of the carrier (10) with and without product (50), and
    at least one of before, during, and/or after a transportation procedure of the carrier (10), determining the mass of the product (50)
    (a) from a variable representative of a change of the movement state of the carrier (10) and/or
    (b) from a variable representative of a means for achieving and/or maintaining the movement state of the carrier (10) with and without product (50),
    wherein the movement state is
    (a) a state of rest of the carrier (10) in relation to at least one reference surface (122) and a state having constant distance between carrier (10) and reference surface (122),
    (b) a state having constant velocity of the carrier (10) parallel to a reference surface (122),
    (c) a vibration state, in which at least the product (50) vibrates linearly in a plane parallel to a reference surface (122) around a rest position, or
    (d) a combination thereof.

* * * * *